Aug. 1, 1950          L. J. SEMEYN          2,517,248

RECEPTACLE AND SUPPORT THEREFOR

Filed March 22, 1948

Inventor
Leonard J. Semeyn
By Liverance and
Van Antwerp
Attorneys

Patented Aug. 1, 1950

2,517,248

UNITED STATES PATENT OFFICE 2,517,248

RECEPTACLE AND SUPPORT THEREFOR

Leonard J. Semeyn, Lamont, Mich.

Application March 22, 1948, Serial No. 16,330

3 Claims. (Cl. 220—69)

This invention relates to a novel washbasin structure, particularly in connection with the bottom thereof, and a practical, simple, effective and novel means for frictionally holding the basin upon any horizontal support therefor on which it is placed.

It is an object and purpose of the present invention to provide a washbasin, at the under side and at the central portion thereof, with a plurality of preferably radially disposed supports which have friction faces to bear against a horizontal support on which the basin is placed, for example, the top of a bench, table, sink or other support, to hold the basin against accidental or aimless movement, or in general any movement thereof which is not wanted. A further object of the invention is to provide a mounting for the friction members which is readily and economically secured at the under side of a bottom of a washbasin, and with said mounting a resilient friction member may be assembled in a very ready manner and will be held in place after it is assembled through the novel structure of its holder.

Figure 1:
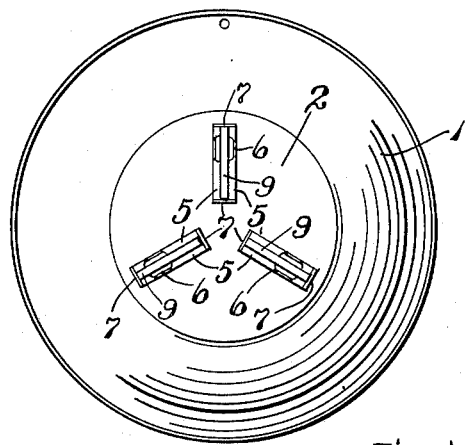
Figure 2:
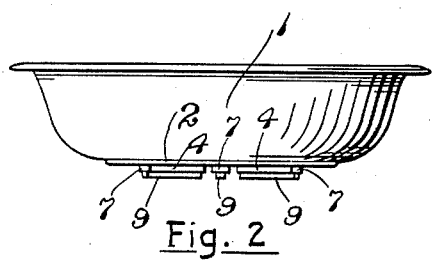
Figure 3:
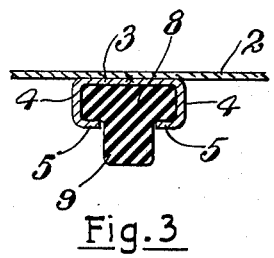
Figure 4:
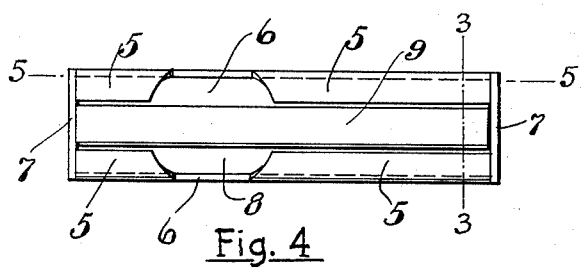

Other objects and purposes than those stated will appear and be understood from the following description of the invention, taken in connection with the accompanying drawing, in which, Fig. 1 is an under plan view of a washbasin equipped with my invention, Fig. 2 is an elevation thereof, Fig. 3 is a fragmentary enlarged transverse section through the bottom of the washbasin and one of the friction members and its holder, substantially on the plane of line 3—3 of Fig. 4.

Figure 5:
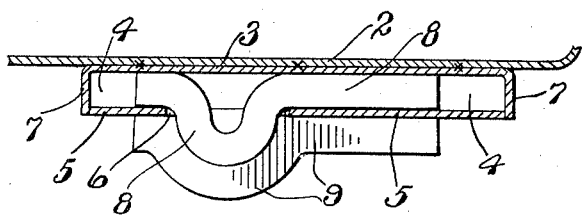

Fig. 4 is an enlarged under plan view of the friction members, a plurality of which preferably are secured at the under side of a washbasin radially around the center thereof, and Fig. 5 is a longitudinal section therethrough and an adjacent portion of the washbasin bottom to which secured, substantially on the plane of line 5—5 of Fig. 4, showing the manner in which the friction member is assembled.

Like reference characters refer to like parts in the different figures of the drawing.

The washbasin 1 of a conventional form and structure has a horizontal flat bottom 2, of generally circular form, to the under side of which the friction holding members mentioned are secured.

Each of said friction holding members comprises a mounting or holder for an immediate friction member, which preferably is of a rubber composition or one having similar properties and characteristics. The holder is made from sheet metal and comprises an upper elongated horizontal web 3, which is secured by spot welding or other permanent fastening means to the under side of the bottom 2 of the basin. At each longitudinal edge of the web 3 flanges 4 are bent to extend downwardly for a short distance and terminate in inturned lips 5 which extend toward each other, but are spaced apart at their free longitudinal edges. Each of the lips 5 is cut away between its ends for a portion of its length, as indicated at 6 (Figs. 4 and 5). At each end of the web 3 an end flange 7 is turned downwardly therefrom, which at its free lower end edge is substantially flush with the under sides of the lips 5 (Fig. 5).

In practice three of the channel holders as described are secured to the under side of the bottom 2 of the basin as shown in Fig. 1. They are located around the center of the bottom and extend radially outward therefrom, being equally spaced from each other, or approximately 120° apart.

After the securing of the holders to the bottom 2 of the basin the friction members are assembled therewith. Each is an elongated strip, preferably of rubber composition, T-shaped in cross section, having an upper body 8, centrally and longitudinally of which, and from its lower side, a narrower integral tongue 9 extends downwardly. The width of the body 8 is such that it is received between the side flanges 4 and the upper web 3 and lower lips 5, as shown in Fig. 3, and the thickness of the tongue 9 is such that it extends through the slot which is made between the spaced free edges of the lips 5. Thus the lower sides of the tongues 9 are what bear against the top of a bench, table, or other support upon which the washbasin is placed, engaging frictionally therewith and holding the basin from free or aimless movement.

The assembly of the rubber members with the holders therefor is by inserting one end of a member into its holder at the cut-away recesses at 6 in the lips 5, and moving it lengthwise thereof as far as practical and feasible, and then bending the rubber member between its ends to form a downwardly extending U as in Fig. 5, until the other end of the member can be inserted in the opening left by the cut-away portions at 6, thereafter straightening the rubber member out until the under side of the tongue 9 is located in a plane parallel to the plane of the inturned lips 5.

With the structure described the sheet metal holding members of generally channel form may be fabricated one after another in quantity and secured to the under side of a basin when wanted. The rubber friction members are readily produced in elongated strips from which the required short lengths thereof are cut.

The structure is very practical and useful, economical to make, and effective for the purposes for which produced.

The invention is defined in the appended claims and is to be considered comprehensive of all forms of structure coming within their scope.

I claim:

1. A receptacle having a bottom, a support therefor comprising a channel permanently attached to said bottom, said channel having closed ends, spaced sides and inwardly turned lips, the inner edges of said lips being spaced apart and said lips having oppositely located notches and a resilient strip of substantially T-shaped cross section, the wider portion of which is received within said channel between said sides and the narrower portion projecting between said lips.

2. The elements of claim 1 in which said notches are spaced from said ends but located closer to one end than the other.

3. The elements of claim 1 in which the lengthwise dimension of said notches is greater than twice the thickness of the cross arm of said T-shaped resilient strip.

LEONARD J. SEMEYN.

REFERENCES CITED

The following references are of record in the file of this patent:

UNITED STATES PATENTS

| Number | Name | Date |
| --- | --- | --- |
| 526,460 | Boennau | Sept. 25, 1894 |
| 689,093 | Kestenbaum | Dec. 17, 1901 |
| 1,228,813 | Osley | June 5, 1917 |
| 2,018,271 | Lewis | Oct. 22, 1935 |

FOREIGN PATENTS

| Number | Country | Date |
| --- | --- | --- |
| 201,639 | Great Britain | Aug. 9, 1923 |